Figure 1:
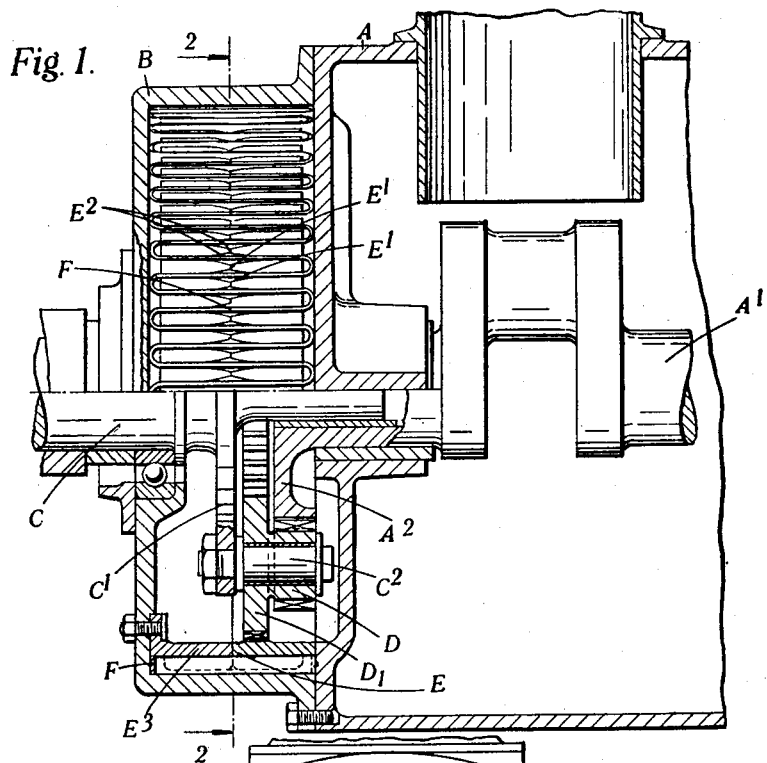

July 1, 1941.   F. B. HALFORD ET AL   2,247,839
MEANS FOR DAMPING TORSIONAL VIBRATIONS IN TRANSMISSION APPARATUS
Filed May 15, 1939   6 Sheets-Sheet 1

Inventors
F. B. HALFORD,
by W. K. WILSON
Attorneys

Inventors
F.B. Halford
by W.K. Wilson
Attorneys

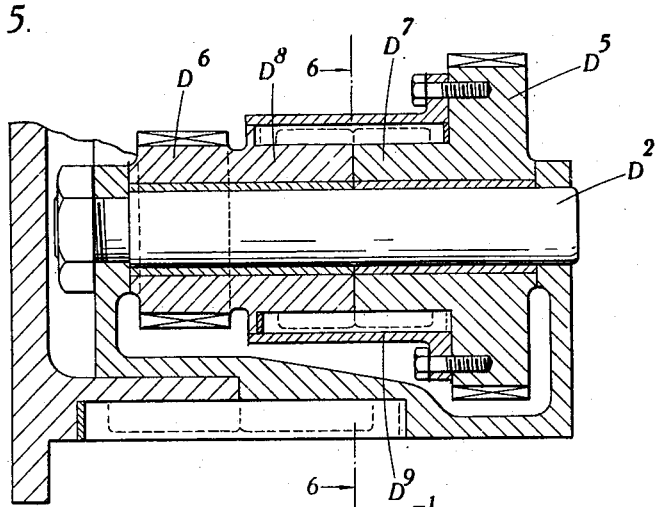
Fig. 5.
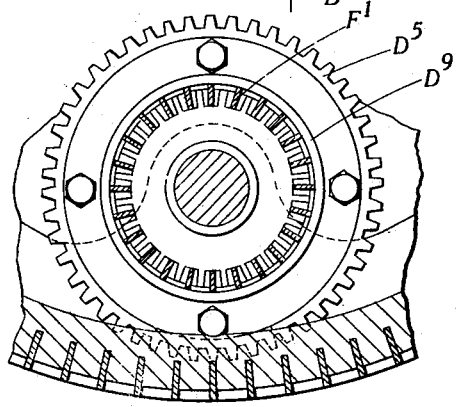
Fig. 6.
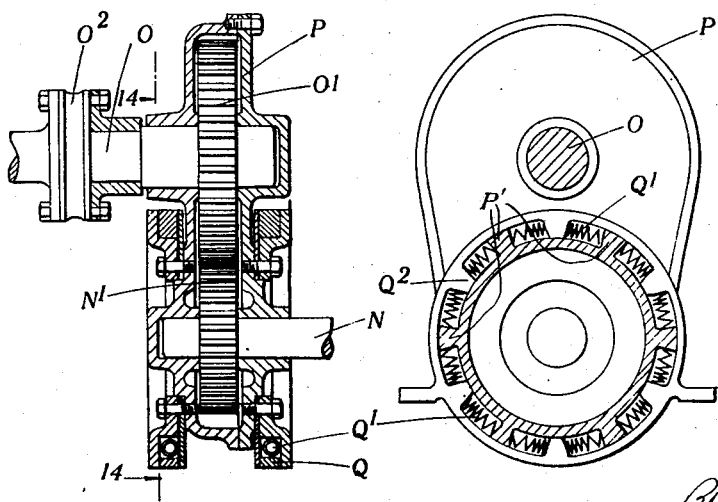
Fig. 14.
Fig. 15.

Patented July 1, 1941

2,247,839

UNITED STATES PATENT OFFICE 2,247,839

MEANS FOR DAMPING TORSIONAL VIBRATIONS IN TRANSMISSION APPARATUS

Frank Bernard Halford and William Ker Wilson, Edgware, England

Application May 15, 1939, Serial No. 273,792
In Great Britain May 17, 1938

2 Claims. (Cl. 74—305)

This invention relates to transmission apparatus having combined therewith means intended to prevent or reduce the occurrence of synchronous torsional oscillations of at least the more violent character over the normal speed range of the engine and is particularly but not exclusively applicable to apparatus for transmitting power from the crankshaft of an internal combustion engine to a transmission shaft.

It has been proposed to provide transmission apparatus between the crankshaft of an internal combustion engine and a propeller shaft comprising epicyclic gearing having its toothed annulus connected to the crankshaft, its planet wheel carrier connected to the propeller shaft and its sun wheel, which thus constitutes the reaction member of the gearing, connected to a fixed part by a series of radially arranged leaf springs and by frictional damping apparatus which together act as a torsional oscillation damper.

In transmission apparatus according to the present invention there is combined with gearing connecting a driving shaft to a driven shaft, one or more resilient connections subject to the torque transmitted, the resilient connection or connections being so constructed and arranged that the force exerted thereby on the parts which they connect does not vary in proportion to the relative movement between such parts. That is to say the law relating the relative movement between the parts connected by the resilient connection or connections and the variations in the force exerted on such parts by the resilient connection or connections is not a straight line law and, for the sake of convenience, therefore, such resilient connection or connections will be hereafter referred to as non-linear resilient connections.

The provision of the resilient connection reduces the natural frequency of torsional oscillation of the whole system comprising the driving shaft, driven shaft and gearing and it will thus be seen that by making the resilient connection or connections non-linear the natural periodicity of torsional oscillation of the whole system varies within predetermined limits with the torque. Thus, by suitably determining the law relating the relative movement between the parts connected by the resilient connection or connections to the force exerted on such parts by the resilient connection or connections, it is possible to keep the amplitudes of the torsional oscillations at values which are considerably below the values which would obtain were a linear instead of non-linear resilient connection employed, because exact resonant conditions cannot be established.

In one arrangement according to the invention there is combined with driving and driven shafts differential gearing one element of which is connected to the driving shaft and one element to the driven shaft while the third element, which thus acts as the reaction element, is anchored to a fixed part through one or more non-linear resilient connections.

Again, the invention may be applied to transmission gearing comprising driving and driven shafts and two or more lay-shafts each of which carries gear wheels meshing respectively with a gear wheel on the driving shaft and a gear wheel on the driven shaft so that power is transmitted between the driving and driven shafts through two or more parallel paths. In such a case the layshafts may be supported by a cage which thus in effect constitutes the third element of differential gearing, this cage being anchored to a fixed part by one or more non-linear connections.

Again, where power is transmitted from a driving to a driven shaft through compound epicyclic gearing or through a series of parallel layshafts each carrying gear wheels meshing respectively with driving and driven gear wheels, as described above, a non-linear spring connection may be provided between the coaxial planet wheels of the compound epicyclic gearing or between the coaxial gear wheels on each of the layshafts. An advantage of this arrangement is that the arrangement of the spring connections in this position tends to assist in ensuring uniform tooth loading as between the various planet or layshaft gear wheels.

The manner in which the resilient connection or connections are caused to follow a non-linear law may vary. In one arrangement, however, the resilient connection or each resilient connection comprises a resilient member and one or more abutment surfaces or members with which, as the resilient member is flexed under increasing torques, different points in the length of the resilient member come into engagement so as to vary the effective free length of the resilient member. Thus, the resilient member or each resilient member may be in the form of a resilient bar or rod subject to bending stresses, one or other or both of the parts which it connects being provided with a curved surface which is progressively engaged by the bar or rod so as to reduce its effective free length as the bending stress thereon increases.

Alternatively, the resilient connection or each resilient connection may comprise two or more leaf, coil or other springs arranged to come into operation successively as the two parts connected thereby move relatively to one another under increased torque.

Figure 2:
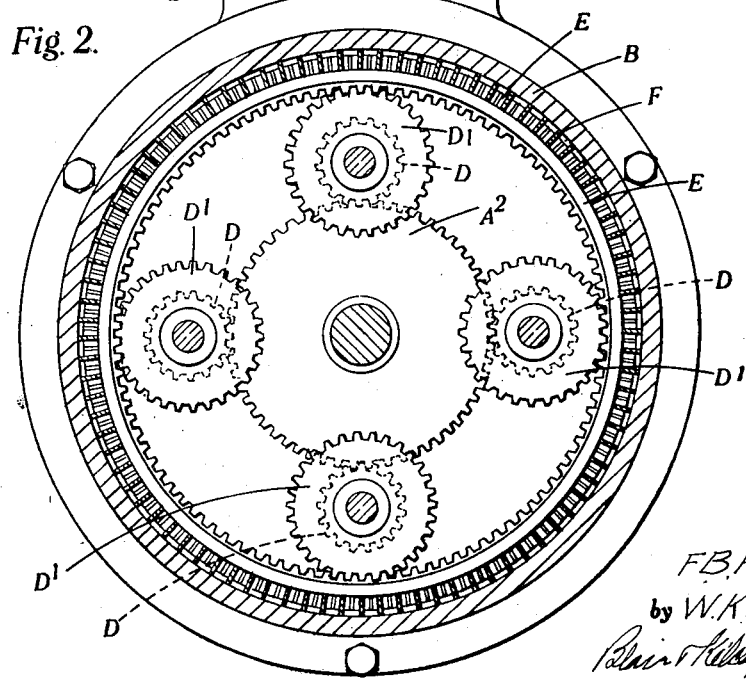
Figure 3:
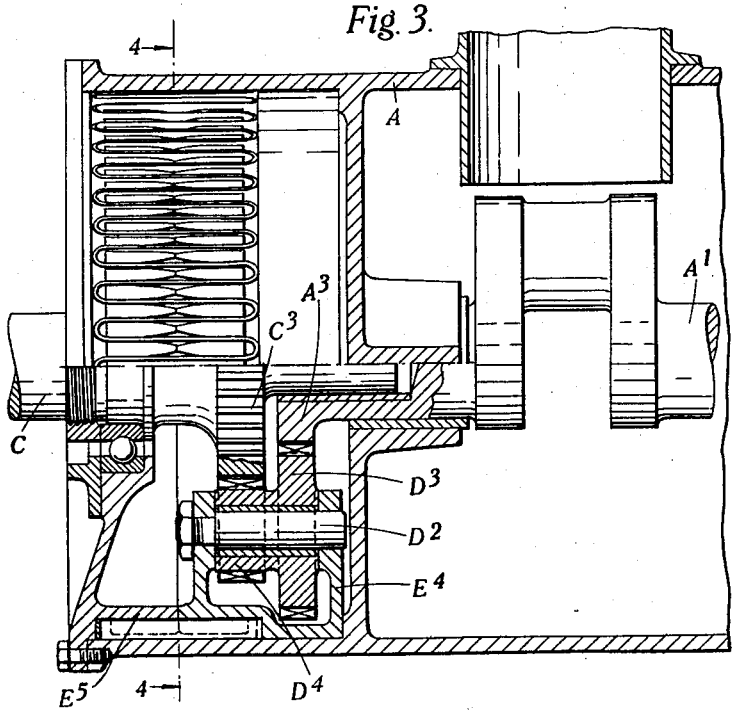
Figure 4:
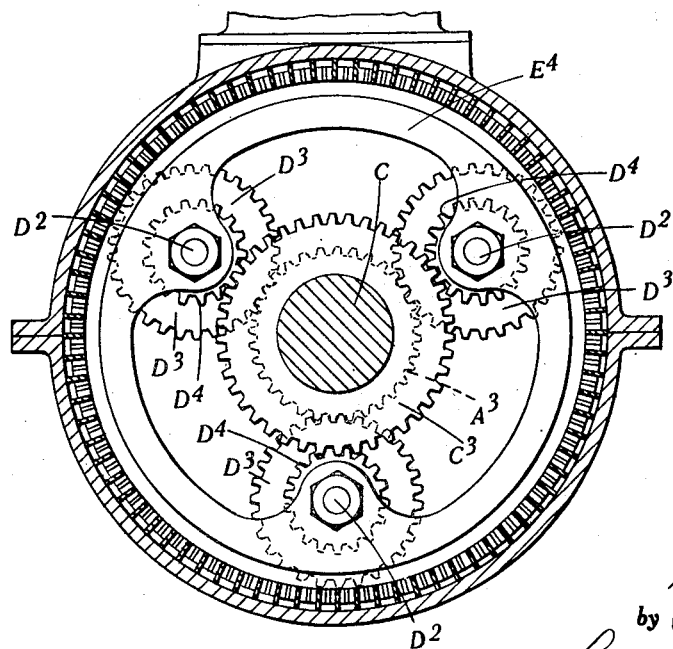
Figure 7:
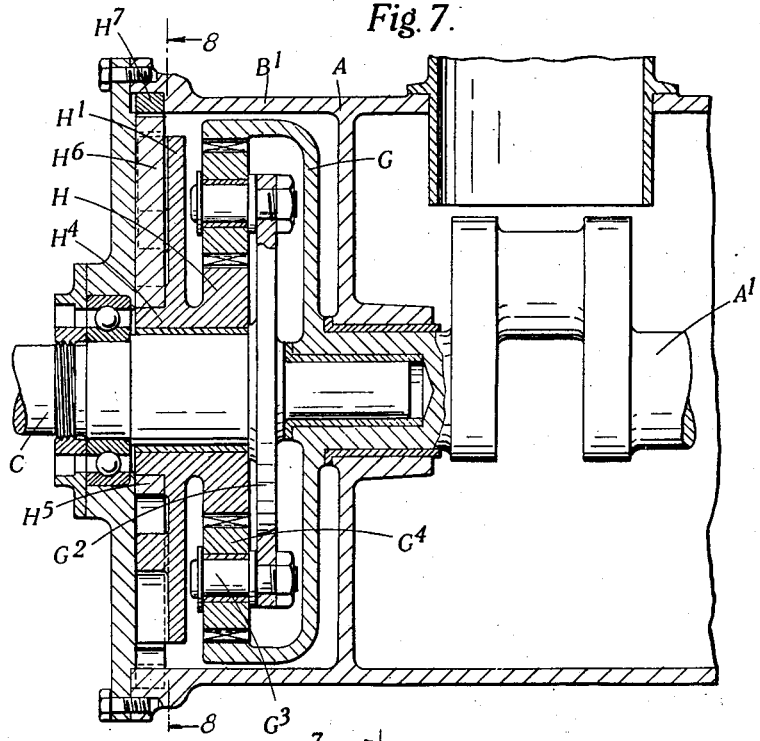
Figure 8:
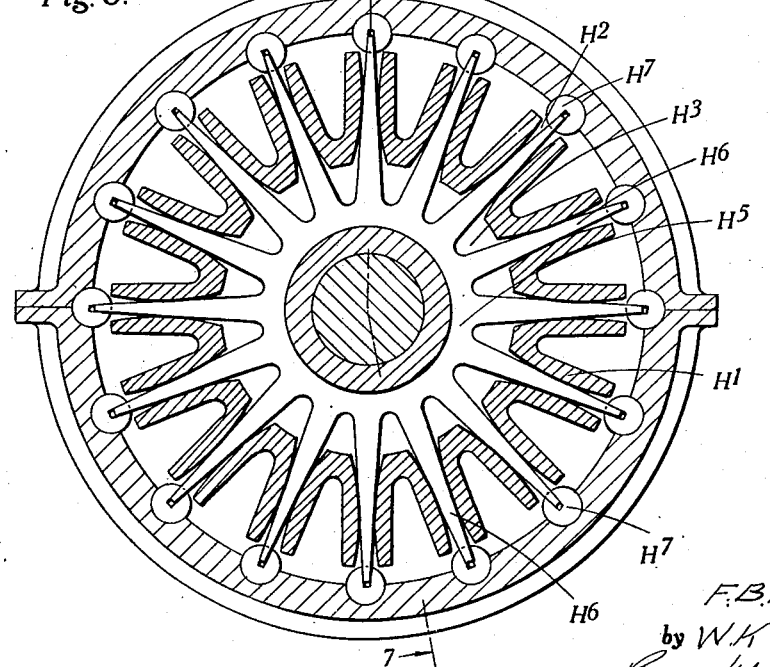
Figure 9:
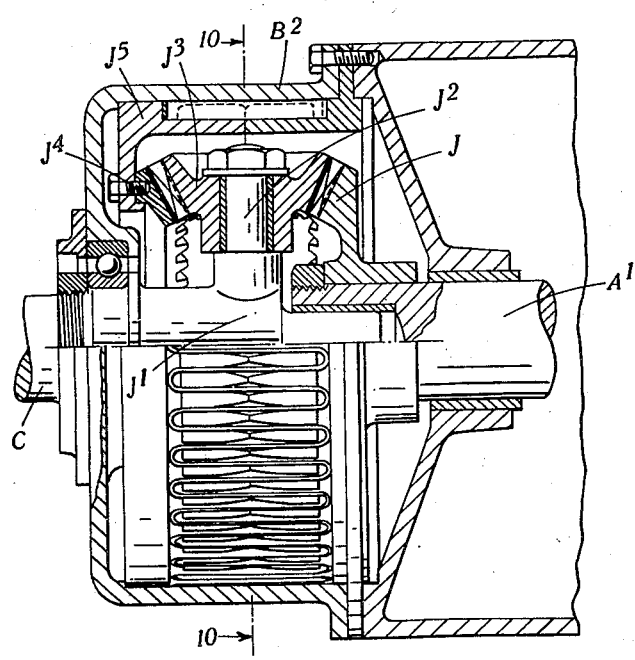
Figure 10:
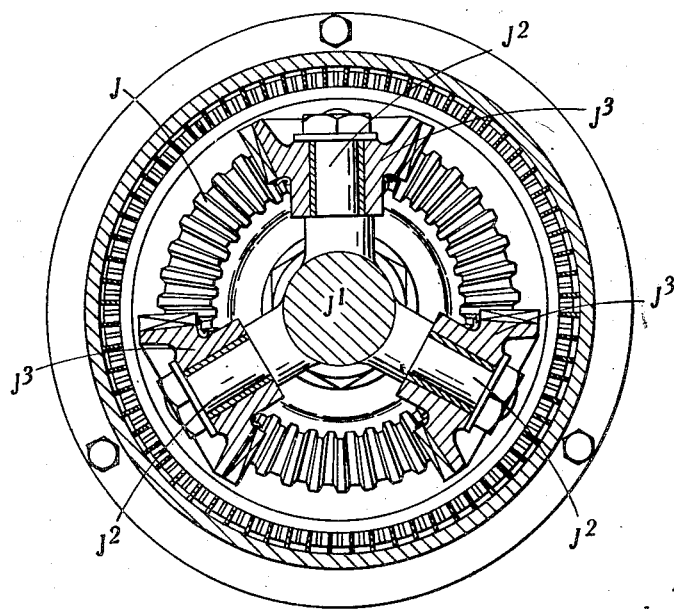
Figure 11:
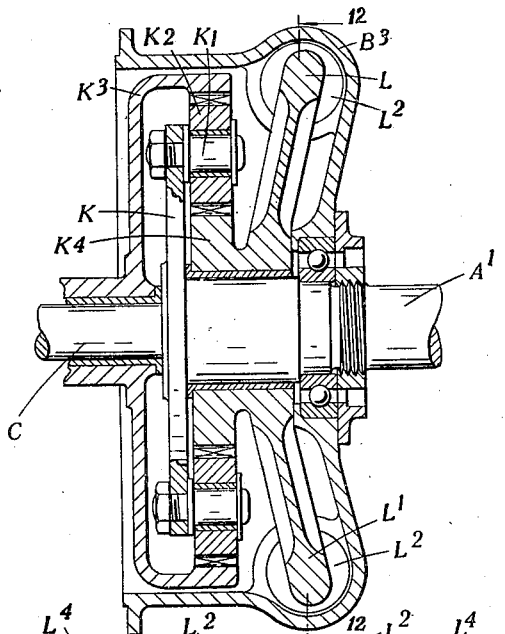
Figure 12:
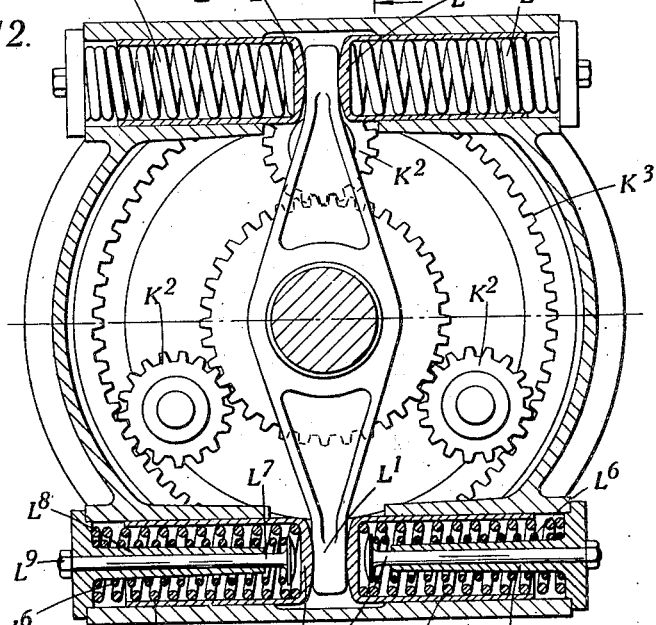
Figure 13:
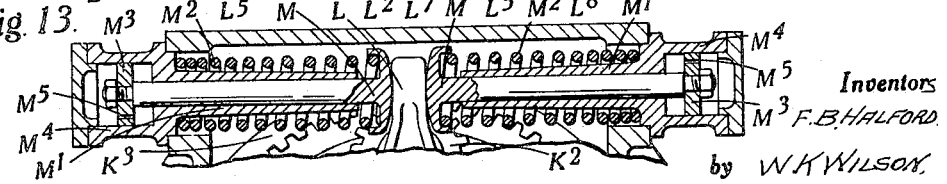

The invention may be carried into practice in various ways but a number of constructions according to the invention are illustrated somewhat diagrammatically in the accompanying drawings, in which Figure 1 is a side elevation, partly in section and partly broken away, of one construction, Figure 2 is a section on the line 2—2 of Figure 1, Figure 3 is a side elevation, partly in section and partly broken away, of another construction, Figure 4 is a section on the line 4—4 of Figure 3, Figure 5 is a sectional side elevation showing a modification of the construction shown in Figures 3 and 4, Figure 6 is a section on the line 6—6 of Figure 5, Figure 7 is a side elevation, partly in section and partly broken away, of a further construction, the section being taken on the line 7—7 of Figure 8, Figure 8 is a section on the line 8—8 of Figure 7, Figure 9 is a side elevation, partly in section and partly broken away, of a further construction, Figure 10 is a section on the line 10—10 of Figure 9, Figure 11 is a sectional side elevation of another construction, Figure 12 is a section on the line 12—12 of Figure 11 showing two forms which the construction may take, Figure 13 shows in section a modification of the construction shown in Figure 12, Figure 14 is a sectional side elevation of a still further construction, and Figure 15 is a section on the line 14—14 of Figure 14.

In the construction illustrated in Figures 1 and 2, the invention is shown as applied to an internal combustion engine to the crankcase A of which is secured a casing B containing transmission gearing by which power is transmitted from the crankshaft $A^1$ to a driven shaft C, for example a propeller shaft.

The transmission gearing is of the epicyclic type and comprises a sun wheel $A^2$ secured to the crankshaft and a spider $C^1$ secured to the driven shaft and carrying a series of spindles $C^2$ on each of which is mounted a pair of interconnected planet wheels one of which D meshes with the sun wheel $A^2$ while the other $D^1$ meshes with the gear teeth of an internally toothed ring E mounted so that it can rock about the common axis of the crankshaft $A^1$ and driven shaft C within the casing B. The toothed ring E thus constitutes the reaction element. This toothed ring is provided in its circumference with a series of axially extending slots the walls of which are curved, as shown at $E^1$, these slots lying opposite corresponding slots having curved walls $E^2$ in a ring $E^3$ rigidly secured to the casing B. The reaction ring E is resiliently connected to the ring $E^3$ by a continuous sinuous resilient strip F passing through and extending between the slots in the two rings, as shown.

It will be seen that as the reaction ring E moves under the reaction imposed thereon, the part of the strip F extending between each pair of opposite slots in the rings E and $E^3$ will flex and will progressively engage one or other of the curved walls $E^1$ and one or other of the curved walls $E^2$ so that the effective free length of the part of the strip in question will be progressively reduced. In this way the stiffness of the resilient coupling between the reaction ring E and the ring $E^3$ and in consequence the natural frequency of the system as a whole will be progressively increased as the reaction on the ring E increases due to transmission of increased torque through the transmission gearing.

In the modified construction shown in Figures 3 and 4, the gearing for transmitting the power from the crankshaft $A^1$ to the driven shaft C comprises a sun wheel $A^3$ secured to the crankshaft, a second sun wheel $C^3$ secured to the driven shaft C and a series of parallel spindles $D^2$ mounted in a ring $E^4$ and each carrying a pair of interconnected spur wheels $D^3$, $D^4$ meshing respectively with the sun wheels $A^3$ and $C^3$. The ring $E^4$ constitutes the reaction member and is resiliently connected to a ring-like part $E^5$ constituting part of the casing containing the gearing by a resilient connection similar to that employed in the construction shown in Figures 1 and 2.

Figures 5 and 6 show a modification which may be employed in a construction otherwise similar to that shown in Figures 3 and 4 and in which, instead of two gear wheels $D^3$, $D^4$ rigidly interconnected, two gear wheels $D^5$, $D^6$ are mounted on each spindle $D^2$ and are resiliently connected together by a resilient coupling of similar type to that employed between the rings E and $E^3$ in Figure 1 and including a resilient sinuous strip $F^1$ extending through slots in two parts $D^7$, $D^8$ formed integral respectively with the gear wheels $D^5$, $D^6$. The resilient strip is maintained in position by an annular housing $D^9$, as shown. It will be seen that this modification provides a further source of resilience the natural period of which varies with variation in tonque in a non-linear manner.

In the construction shown in Figures 7 and 8, the crankshaft $A^1$ is connected to the driven shaft C by gearing housed within a casing $B^1$ and comprising an internally toothed ring G secured to the crankshaft $A^1$, a spider $G^2$ secured to the driven shaft C and carrying a series of spindles $G^3$ on each of which is mounted a planet wheel $G^4$ meshing with the toothed annulus G and with a sun wheel H. The sun wheel H is connected to the casing $B^1$ by a resilient connection and to this end has formed integral therewith a disc-like part $H^1$ in one face of which are formed a series of radial slots $H^2$ having curved sides, as shown, the inner ends of which open into an annular chamber $H^3$. Freely surrounding a boss $H^4$ also formed integral with the sun wheel H is a member $H^5$ having a series of resilient radial arms $H^6$ which pass through the slots $H^2$ and at their outer ends engage anchoring members $H^7$ of cylindrical form arranged in semi-cylindrical recesses in the inner circumference of the casing $B^1$.

In this construction it will be seen that the sun wheel H constitutes the reaction member and that, as the reaction thereon increases, the resilient arms $H^6$ will be flexed so that their sides come progressively into engagement with a greater and greater length of the sides of the slots $H^2$, whereby the effective free length of the arms is progressively reduced so as to reduce progressively the natural period of vibration of the whole system as the torque transmitted through the gearing increases.

In the modification shown in Figures 9 and 10 the crankshaft $A^1$ is connected to the driven shaft C by gearing comprising a bevel gear J rigidly secured to the crankshaft $A^1$, a spider $J^1$ having radial spindles $J^2$ secured to the driven shaft C and bevel wheels $J^3$ mounted on the radial spindles $J^2$ and each of which meshes with the bevel wheel J and with a bevel wheel $J^4$ secured to a ring $J^5$ which is connected to the fixed casing $B^2$ enclosing the gearing by a resilient coupling of the kind employed between the rings E and $E^3$ in the construction shown in Figure 1.

In the construction illustrated in Figures 11 and 12 the transmission gearing between the driven shaft $A^1$ and the driving shaft C comprises a spider K rigidly secured to the driven shaft $A^1$ and carrying a series of spindles $K^1$ each supporting a planet wheel $K^2$ which meshes with an internally toothed ring $K^3$ rigidly secured to the driving shaft C and with a sun wheel $K^4$ which is connected to the casing $B^3$ enclosing the gearing by a resilient connection. Thus the gear wheel $K^4$ has rigidly connected thereto two arms L, $L^1$ the outer end of each of which lies between the ends of two spring-pressed buffers $L^2$.

Figure 12 shows two arrangements of the springs controlling the buffers $L^2$ which may be adopted to provide a non-linear resilient connection between the arms L, $L^1$ and the casing $B^3$. Thus, in the arrangement shown in the upper half of Figure 12, helical springs $L^4$ acting on the buffers vary in pitch throughout their length from one end at which adjacent coils are substantially in contact to the other end where they are appreciably spaced apart. Thus, as either of the springs $L^4$ is compressed due to increased reaction on the arm L, adjacent coils come progressively into engagement with one another so as to reduce the effective free length and hence the natural period of the spring and therefore of the whole system.

In the modification shown in the lower part of Figure 12 each of the buffers $L^2$ is acted upon by a helical spring $L^5$ within which lies a second helical spring $L^6$ acting upon the head of a stop member $L^7$ which is free to slide axially within a guide $L^8$ but is held normally out of contact with the head of the buffer $L^2$ by a stop nut $L^9$ on its outer end. Thus, when the arm $L^1$ is subject only to small reaction one or other of the springs $L^5$ only will resist movement thereof. When the reaction increases above a certain point, however, the head of the appropriate buffer $L^2$ will come into contact with the head of the member $L^7$ so that the spring $L^6$ is also brought into effective operation, whereby the resilient connection between the arms L, $L^1$ and the casing $B^3$ is caused to be of a non-linear character.

In the modification shown in Figure 13, which may be applied to a structure otherwise similar to that shown in Figures 11 and 12, buffer members M controlling the movement of the arm L are employed, these buffer members being free to slide in guides $M^1$ and being acted upon by helical springs $M^2$ of the same form as the springs $L^4$ shown in the upper half of Figure 12. The outer ends of the buffer members M carry pistons $M^3$ sliding in cylinders $M^4$ and having small leak passages $M^5$ so that the pistons act as dashpots tending to resist rapid movements of the buffer members M.

In the construction shown in Figures 14 and 15, the transmission gearing comprises a driving shaft N and a driven shaft O connected by gear wheels $N^1$ and $O^1$ mounted in bearings in a casing P. The shaft O incorporates a flexible coupling $O^2$ and the casing P is mounted in a ring Q so as to be capable of rocking about the axis of the shaft N. Such rocking movement is resisted by a series of helical springs $Q^1$ each disposed in a circumferential space between a lug $P^1$ on the casing P and a lug $Q^2$ on the ring Q. Each spring is of varying pitch throughout its length so that as relative rocking movement between the casing P and the ring Q takes place, the adjacent coils of the spring come progressively into engagement with one another so as to reduce the effective free length and hence the natural periodicity of the springs and hence the natural periodicity of the system as a whole.

It is to be understood that with construction according to the invention values will be chosen such that the natural periodicity of the system as a whole varies as the non-linear resilient connections are stressed in such a manner as to prevent or reduce the occurrence of synchronous torsional oscillations over the normal speed range of the engine. Thus torsional synchronous oscillations, at least of any violent character, tend to be avoided.

An additional advantage of transmission apparatus according to the invention, when used in cases where the driving forces vary in relation to the rotational speed according to some definite law, for example the law of torque variation with speed of a propeller or airscrew in the case of a marine or aircraft power installation, so that the mean torque reaction on the resilient connection or connections varies with the rotational speed so as to be small when the rotational speed is low and large when the rotational speed is high, is that the arrangement can be such that the mean stiffness of the non-linear resilient connection or connections will similarly vary in relation to the rotational speed. Consequently there is a progressive change of natural frequency of the system with rotational speed and this tends to have the advantage of increasing the difference in speed between successive synchronous speeds compared with the difference in speed between successive synchronous speeds which would obtain with linear resilient connections.

What we claim as our invention and desire to secure by Letters Patent is:

1. Transmission apparatus including in combination a driving shaft, a driven shaft, differential gearing one element of which is connected to the driving shaft and one element to the driven shaft, and a resilient anchorage for the third or reaction element comprising a ring-like element rigid with the reaction element and having a series of circumferentially spaced axially extending slots therein, a fixed ring-like element having a corresponding series of circumferentially spaced axially extending slots, the walls in both ring-like elements tapering from wider portions at their adjacent ends to narrower portions at their remote ends, and a continuous sinuous spring member having substantially straight parts extending through and between the slots in the two ring-like elements and joined by curved portions extending between the parts in adjacent slots.

2. Transmission apparatus including in combination a driving shaft, a driven shaft, epicyclic gearing one element of which is connected to the driving shaft and one element to the driven shaft, and a resilient anchorage for the third or reaction element comprising a ring-like element rigid with the reaction element and having a series of circumferentially spaced axially extending slots therein, a fixed ring-like element having a corresponding series of circumferentially spaced axially extending slots, the walls in both ring-like elements tapering from wider portions at their adjacent ends to narrower portions at their remote ends, and a continuous sinuous spring member having substantially straight parts extending through and between the slots in the two ring-like elements and joined by curved portions extending between the parts in adjacent slots.

FRANK BERNARD HALFORD.
WILLIAM KER WILSON.